US007881610B2

(12) United States Patent
Bellotti et al.

(10) Patent No.: US 7,881,610 B2
(45) Date of Patent: Feb. 1, 2011

(54) METHOD OF TRANSMITTING AN OPTICAL SIGNAL IN AN OPTICAL TRANSMISSION SYSTEM AND OPTICAL TRANSMISSION SYSTEM FOR IMPLEMENTING SUCH A METHOD

(75) Inventors: Giovanni Bellotti, Parma (IT); Alessandro Iachelini, Erba (IT)

(73) Assignee: Alcatel, Paris (FR)

( * ) Notice: Subject to any disclaimer, the term of this patent is extended or adjusted under 35 U.S.C. 154(b) by 742 days.

(21) Appl. No.: 11/412,747

(22) Filed: Apr. 28, 2006

(65) Prior Publication Data

US 2006/0257087 A1   Nov. 16, 2006

(30) Foreign Application Priority Data

May 11, 2005   (EP)   ................................. 05291018

(51) Int. Cl.
  *H04B 10/00*   (2006.01)
(52) U.S. Cl. ............................. 398/29; 398/28; 398/25; 398/147; 398/159
(58) Field of Classification Search .................. 398/29, 398/148, 147, 81, 28, 25, 158, 159
  See application file for complete search history.

(56) References Cited

U.S. PATENT DOCUMENTS

| | | | | |
|---|---|---|---|---|
| 5,224,183 | A * | 6/1993 | Dugan | 385/24 |
| 5,557,694 | A * | 9/1996 | Veith et al. | 385/27 |
| 5,737,347 | A * | 4/1998 | Scheps et al. | 372/23 |
| 5,809,196 | A | 9/1998 | Meli et al. | |

(Continued)

FOREIGN PATENT DOCUMENTS

WO   WO 9943118 A1   8/1999

OTHER PUBLICATIONS

International Telecommunication Union: "Series G: Transmission Systems and Media, Digital Systems and Networks, Transmission media characteristics—Optical fibre cables, Characteristics of a single -mode optical fibre and cable." G.652, Mar. 2003.
International Telecommunication Union: "Series G: Transmission Systems and Media, Digital Systems and Networks, Transmission media characteristics—Optical fibre cables, Characteristics of a dispersion-shifted single-mode optical fibre and cable." G.653, Dec. 2003.

(Continued)

*Primary Examiner*—Ken N Vanderpuye
*Assistant Examiner*—Hibret A Woldekidan
(74) *Attorney, Agent, or Firm*—Carmen Patti Law Group, LLC (57) ABSTRACT

Described is a method of transmitting an optical signal in an optical transmission system. The method comprises: providing a length of an optical fiber having a zero chromatic dispersion wavelength, wherein the optical fiber belongs to an optical fiber group and wherein the optical fiber group comprises optical fibers having a zero chromatic dispersion wavelength comprised within a wavelength range; estimating a tolerated chromatic dispersion range; and transmitting the optical signal over the length of optical fiber at a first transmission wavelength. The method is characterized by estimating, within the wavelength range, at least one wavelength sub-range, the at least one wavelength sub-range being such that an optical signal is affected by a chromatic dispersion which is comprised within a tolerated chromatic dispersion range when the optical signal is transmitted
  a) at any wavelength of the at least one sub-range, and
  b) over any optical fiber of at least one optical fiber sub-group of the optical fiber group,
wherein the first transmission wavelength is comprised within the at least one wavelength sub-range.

31 Claims, 7 Drawing Sheets

U.S. PATENT DOCUMENTS

| | | | |
|---|---|---|---|
| 6,043,914 A * | 3/2000 | Cook et al. | 398/1 |
| 6,055,352 A | 4/2000 | Kim et al. | |
| 7,221,439 B2 * | 5/2007 | Chen et al. | 356/73.1 |
| 7,221,877 B2 * | 5/2007 | Fuerst et al. | 398/159 |
| 7,580,639 B2 * | 8/2009 | Fee et al. | 398/148 |
| 2003/0174311 A1 * | 9/2003 | Wilson et al. | 356/73.1 |
| 2004/0033040 A1 * | 2/2004 | Takahashi et al. | 385/123 |
| 2004/0190840 A1 | 9/2004 | Deutsch et al. | |
| 2004/0213564 A1 * | 10/2004 | Sakano et al. | 398/12 |

OTHER PUBLICATIONS

International Telecommunication Union: "Series G: Transmission Systems and Media, Digital Systems and Networks, Transmission media characteristics—Optical fibre cables, Characteristics of a non-zero dispersion-shifted single-mode optical fibre and cable." G.655, Mar. 2003.

* cited by examiner

METHOD OF TRANSMITTING AN OPTICAL SIGNAL IN AN OPTICAL TRANSMISSION SYSTEM AND OPTICAL TRANSMISSION SYSTEM FOR IMPLEMENTING SUCH A METHOD

BACKGROUND OF THE INVENTION

1. Field of the Invention

The present invention generally relates to guided transmission of optical signals. In particular, the present invention relates to a method of transmitting an optical signal in an optical transmission system and an optical transmission system which implements such a method. The present invention further relates to a method for selecting a transmission wavelength for transmitting an optical signal in an optical transmission system.

2. Description of the Prior Art

In an optical transmission system, information is transmitted by means of optical signals. Typically, an optical transmission system comprises at least one transmitter, the at least one transmitter being adapted to transmit a channel, i.e. an optical signal at a given wavelength. Optical signals are then transmitted through a link.

The link generally comprises one or more spans of optical fiber. During propagation along each span, a fraction of the optical signal power is absorbed by the optical fiber. Thus, at the end of each span, a respective amplifier may be provided in order to compensate the optical fiber absorption.

An optical transmission system may be either a single-channel transmission system or a multi-channel transmission system (e.g. Wavelength Division Multiplexing or, briefly, WDM transmission systems). The channel wavelengths are generally established by standards defining, among other parameters, the channel position, the channel wavelength tolerance and, in case of multi-channel transmission systems, the channel spacing. For instance, the Dense WDM standard defines an equispaced channel grid between 1530 nm and 1625 nm; the channel spacing is 0.8 nm and the channel wavelength tolerance is +/− about 0.1 nm. Another example is the Coarse WDM standard, which defines an equispaced channel grid between 1270 nm and 1610 nm; the channel spacing is 20 nm, and the channel wavelength tolerance is +/−6.5 nm.

Generally speaking, reducing the channel spacing results in a more expensive WDM transmission system. Indeed, closer channels require more costly transmitters, as the wavelength of the transmitter laser source must be more stable. This requires more accurate, and therefore more costly, temperature and feeding current control equipments. Further, reducing the channel spacing also increases the cost of multiplexers and demultiplexers, since they become more complex to design and to manufacture.

As already mentioned, in an optical transmission system information is transmitted by means of optical signals. More particularly, data to be transmitted comprise a bit sequence. Thus, the optical signal transporting such a bit sequence consists of a carrier at the channel wavelength which is modulated by the bit sequence. The width of the time frame required for transmitting a single bit (or bit period) determines the bit-rate of the optical transmission system, which is measured in bit/s. For instance, if the bit period is 100 ps, the bit-rate is $10 \cdot 10^9$ bit/s=10 Gbit/s.

Different modulation formats are known in the field of optical transmissions. In the following description, it is assumed that the bit sequence modulates the carrier though a binary amplitude modulation, wherein an optical pulse with amplitude substantially different from zero is associated to a first logical level "1", while an optical pulse with amplitude substantially equal to zero is associated to a second logical level "0". However, any other modulation format (frequency modulation, phase modulation, multi-level modulations . . . ) can be provided as well.

Typically, the width of each pulse is lower than or equal to the bit period, so that consecutive pulses do not temporally overlap. This allows the receiver to distinguish consecutive pulses and to associate them to corresponding logical levels "1" or "0".

However, during propagation, pulses may change their shape, in particular their amplitude and their width, due to an effect which is termed dispersion.

The dispersion is an effect wherein waves at different wavelengths propagate in a material at different speeds. As a pulse comprises the superimposition of waves at different wavelengths, such waves propagate into an optical fiber at different speeds, thus modifying the pulse shape. In particular, the pulse width increases, and the pulse amplitude is correspondingly reduced. The pulse width increases by increasing the optical fiber length. Further, the pulse width increases according to a coefficient which is called chromatic dispersion, whose value depends on the optical fiber characteristics, and which is expressed in ps/nm/km. The chromatic dispersion of an optical fiber substantially is the delay (expressed in ps) of the propagation time of two waves having 1-nm spaced wavelengths, over a 1-km long span of said optical fiber.

It has to be noticed that chromatic dispersion is positive in case waves with higher wavelengths propagate at lower speed with respect to waves with lower wavelengths. On the contrary, the chromatic dispersion is negative in case waves with higher wavelengths propagate at higher speed with respect to waves with lower wavelengths.

Moreover, the chromatic dispersion of an optical fiber depends on the wavelength of the optical signal propagating along the optical fiber. Typically, in optical fibers for optical transmission systems, the chromatic dispersion increases with the wavelength, at least in the wavelength range which is typically used for optical transmission systems. The chromatic dispersion of such optical fibers becomes zero at a zero dispersion wavelength. For instance, optical fibers G.652, which are standardized by the homonymous ITU-T Recommendation, have zero dispersion wavelength at about 1310 nm. Further, optical fibers G.653, which are standardized by the homonymous ITU-T Recommendation, have zero dispersion wavelength at about 1550 nm. The zero dispersion wavelength of an optical fiber is generally defined with a zero dispersion wavelength tolerance, as it will be discussed in further details herein after. Such a zero dispersion wavelength tolerance may be indicated either into the relevant ITU-T Recommendation of the optical fiber, or into fiber specifications provided by optical fiber suppliers.

Generally speaking, dispersion affects the performances of an optical transmission system. Indeed, in an optical transmission systems, pulses are received by a receiver. The receiver associates to each pulse a respective logic value "1" or "0". However, if the pulse shape is distorted due to dispersion (higher pulse width and lower pulse amplitude), the receiver is no longer able to properly associate each pulse to the respective logic value. It can be shown, by means of equations which are not reported into the present description, that, in case fiber non-linearity is negligible, the performance of an optical transmission system deteriorates by increasing the bit-rate and by increasing the accumulated dispersion, wherein the accumulated dispersion is defined as the product of the chromatic dispersion of an optical fiber and the length of said optical fiber. It has to be noticed that the performance of an optical transmission system also depends on other system parameters (modulation format, receiver threshold, and the like). However, the effects of this parameters will not be taken into account into the present description.

Thus, once the bit-rate and the other system parameters (modulation format, receiver threshold, and the like) of an optical transmission system have been set, a tolerated accumulated dispersion range can be estimated wherein system performances are acceptable. For instance, an optical transmission system with a bit-rate of 10 Gbit/s may have a tolerated accumulated dispersion range between −960 ps/nm and 960 ps/nm. If, in the same optical transmission system, the bit-rate is increased to 40 Gbit/s, the tolerated accumulated dispersion range becomes between −60 ps/nm and 60 ps/nm.

Thus, at the end of the optical fiber link of an optical transmission system, the accumulated dispersion of an optical signal must be comprised within said tolerated accumulated dispersion range.

A know technique for providing, in an optical transmission system, an optical signal with accumulated dispersion comprised within a tolerated accumulated dispersion range is the so-called dispersion compensation technique. Dispersion compensation technique consists in providing each span of a link with a respective dispersion compensator, which introduces on the optical signal a compensation dispersion, i.e. a dispersion with opposite sign with respect to the dispersion of the span. Such dispersion compensators may be implemented through Dispersion Compensating Fibers (DCF) or other dispersive components, such as Bragg gratings. Therefore, the accumulated dispersion of an optical signal at the end of the link is the sum of the accumulated dispersion of the spans and of the accumulated dispersion of the dispersion compensators. The compensation dispersions are tailored so that the accumulated dispersion at the end of the link is comprised within the tolerated accumulated dispersion range.

Such a dispersion compensation technique has some disadvantages. First of all, providing a dispersion compensator for each span increases the optical transmission system cost. Moreover, the dispersion compensators absorb a part of the optical signal power. Such absorption must be compensated, for instance, by increasing the optical power of the transmitter; this however increases both the cost of the transmitter and the complexity of the transmitter safety equipments. As an alternative, the absorption can be compensated by increasing the amplifier gain; this however increases both the amplifier cost and the complexity of the amplifier safety equipments. As an alternative, a double stage amplifier can be provided at the end of each span, and the respective dispersion compensator may be inserted between the first stage and the second stage of the amplifier; this however increases the cost of the amplifier. As an alternative, a higher sensitivity receiver may be provided; this however increases the receiver cost.

SUMMARY OF THE INVENTION

The object of the present invention is providing a method for transmitting an optical signal in an optical transmission system, wherein the optical signal, at the end of the optical fiber link, has an accumulated dispersion which is comprised within a tolerated accumulated dispersion range, which is less expensive than the above mentioned dispersion compensation technique, and which can be implemented without providing the optical transmission system with additional devices.

This and other objects are achieved by a method of transmitting an optical signal in an optical transmission system according to claim 1, by an optical transmission system according to claim 11, and by method for selecting a transmission wavelength for transmitting an optical signal in an optical transmission system according to claim 21. Further advantageous features are set forth into the respective dependent claims. All the claims are deemed to be an integral part of the present description.

According to a first aspect, the present invention provides a method of transmitting an optical signal in an optical transmission system. The method comprises: providing a length of an optical fiber having a zero chromatic dispersion wavelength, wherein the optical fiber belongs to an optical fiber group and wherein the optical fiber group comprises optical fibers having a zero chromatic dispersion wavelength comprised within a wavelength range; estimating a tolerated chromatic dispersion range; and transmitting the optical signal over the length of optical fiber at a first transmission wavelength. The method is characterized by estimating, within the wavelength range, at least one wavelength sub-range, the at least one wavelength sub-range being such that an optical signal is affected by a chromatic dispersion which is comprised within a tolerated chromatic dispersion range when the optical signal is transmitted a) at any wavelength of the at least one sub-range, and b) over any optical fiber of at least one optical fiber sub-group of the optical fiber group, wherein the first transmission wavelength is comprised within the at least one wavelength sub-range.

According to a second aspect, the present invention provides an optical transmission system comprising: a length of an optical fiber having a zero chromatic dispersion wavelength, wherein the optical fiber belongs to an optical fiber group and wherein the optical fiber group comprises optical fibers having a zero chromatic dispersion wavelength comprised within a wavelength range; and a transmitter being adapted to transmit the optical signal over the length of optical fiber at a first transmission wavelength. The system is characterized in that the first transmission wavelength is comprised within a wavelength sub-range, the wavelength sub-range being comprised within the wavelength range and being such that an optical signal is affected by a chromatic dispersion which is comprised within a tolerated chromatic dispersion range when the optical signal is transmitted at any wavelength of the wavelength sub-range ($\lambda$min, $\lambda$max), and over any optical fiber of an optical fiber sub-group of the optical fiber group. According to a third aspect, the invention provides a method of selecting a transmission wavelength for transmitting a first optical signal in a wavelength division multiplexing transmission system, the method comprising: selecting a group of optical fibers, the optical fibers of the group having a zero chromatic dispersion wavelength comprised within a wavelength range; estimating a chromatic dispersion range; estimating, within the wavelength range, one wavelength sub-range, the wavelength sub-range being such that the chromatic dispersion of any optical fiber of a sub-group of the group of optical fibers is comprised within the chromatic dispersion range for any wavelength of the wavelength sub-range; and selecting the transmission wavelength such that it is comprised within the wavelength sub-range.

Thus, thanks to the method according to the present invention, additional costs due both to additional devices, and to the need of compensating the power absorption of such additional devices are avoided. Reducing the overall optical transmission system cost is particularly interesting for Coarse WDM applications, wherein low cost transmission systems are specifically required. Nevertheless, the method of the invention may be advantageously applied also to Dense WDM, wherein it can help to reduce, at least partially, the overall system cost.

Moreover, advantageously, according to the present invention, designing an optical transmission system simply requires to know the fiber type (G.652, G.653, G.655 or the like) of the optical fiber comprised into the link, but it is not necessary to know the exact chromatic dispersion curve of the specific optical fiber comprised into the link. This, for instance, is particularly advantageous when one has to design an optical transmission system whose link has been installed previously, and/or by a different operator.

Further features and advantages of the present invention will become clear by the following description, given by way of non-limiting example, to be read with reference to the accompanying drawings.

BEST MODE FOR CARRYING OUT THE INVENTION

Figure 1A:
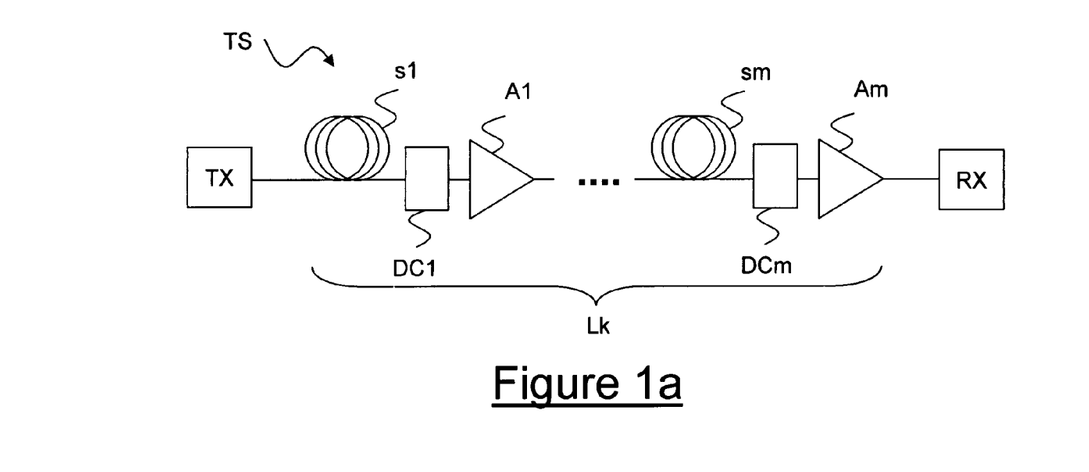
FIGS. 1a and 1b schematically show a single-channel optical transmission system and a WDM transmission system, respectively, implementing the known dispersion compensation technique.

FIG. 1a shows a single-channel optical transmission system TS. The optical transmission system TS comprises a transmitter TX, a receiver RX and a link Lk. As already mentioned, the transmitter TX is adapted to transmit an optical signal at a transmission wavelength through the link Lk.

The link Lk comprises m cascaded spans s1, . . . sm of optical fiber. In case m is equal to 1, the optical transmission system is typically referred to as a "single-span transmission system". In the present description, for simplicity, it will be assumed that all the spans have the same length "l". Besides, "L" will refer to the length of the whole link. Therefore L=ml.

As already mentioned, each span s1, . . . sm may comprise a respective amplifier A1, . . . Am. At the end of the link Lk, the optical signal is received at the receiver RX.

Figure 1B:
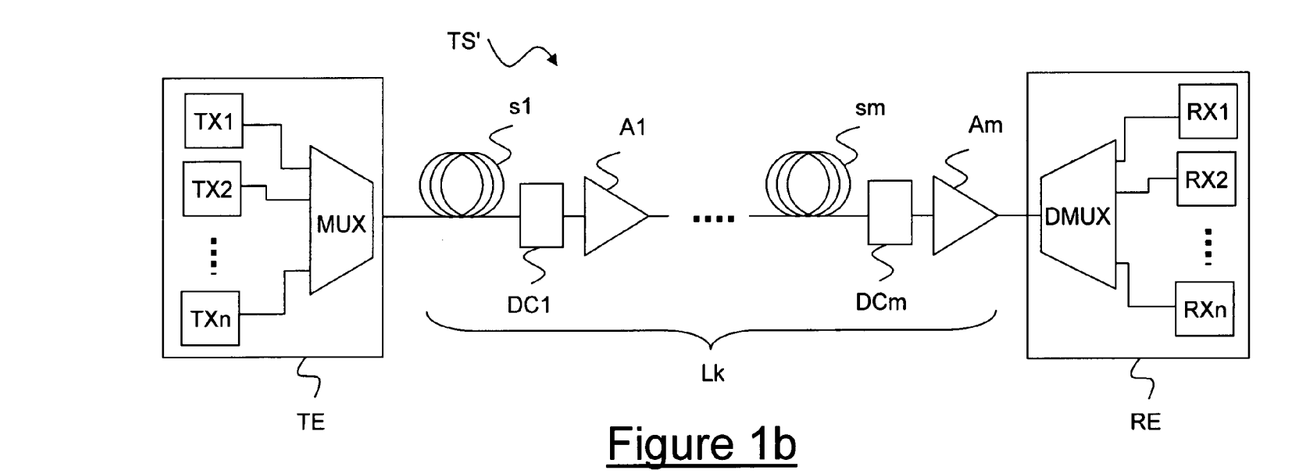

FIG. 1b shows a WDM transmission system TS'. The WDM transmission system of FIG. 1b is adapted to transmit n channels (with n being an integer >1) from a transmitting equipment TE to a receiving equipment RE. The transmitting equipment TE comprises n transmitters TX1, TX2, . . . TXn. Each transmitter is adapted to transmit at a transmission wavelength of a WDM (e.g. Dense WDM or Coarse WDM) channel grid. The transmitting equipment TE further comprises a multiplexer MUX, which is adapted to receive the n optical signals from the transmitters TX1, TX2, . . . TXn, to multiplex them and transmit them along a link Lk. The receiving equipment RE comprises a demultiplexer DMUX, which is adapted to receive the n optical signals incoming from the link Lk and to demultiplex them. After demultiplexing, the demultiplexer DMUX sends each optical signal to a respective receiver RX1, RX2, . . . RXn.

The link Lk is similar to the link Lk of FIG. 1a; thus, a description of the link Lk of FIG. 1b will not be repeated.

Both the single-channel transmission system of FIG. 1a and the WDM transmission system of FIG. 1b implement the known dispersion compensation technique, which has been described above. As shown in FIGS. 1a and 1b, according to the dispersion compensation technique, each span s1, . . . sm comprises a respective dispersion compensator DC1, . . . DCm. It must be noticed that in FIGS. 1a and 1b each dispersion compensator is inserted between the respective span and the respective amplifier. Nevertheless, in case the amplifiers A1, . . . Am are two-stage amplifiers, the dispersion compensator may also be inserted between the two stages of the respective amplifier.

Figure 2A:
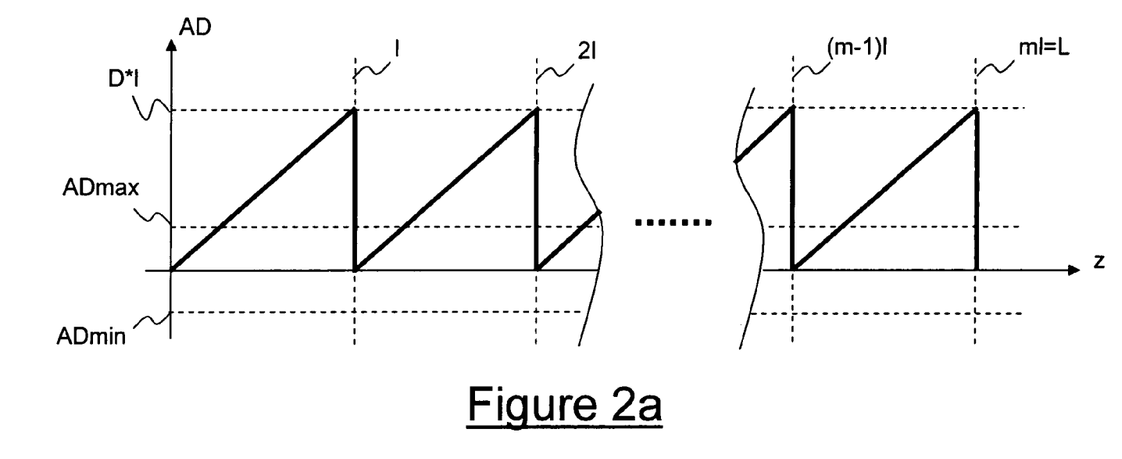
FIGS. 2a and 2b qualitatively show the accumulated dispersion of an optical signal during propagation in the optical transmission system of FIG. 1a or 1b, and in a optical transmission system according to the present invention, respectively.

FIG. 2a qualitatively shows the accumulated dispersion AD, as a function of the propagation coordinate z, of an optical signal transmitted either into the single-channel transmission system TS of FIG. 1a or in the WDM transmission system TS' of FIG. 1b. The graph of FIG. 2a is not in scale.

As already mentioned, the accumulated dispersion AD is defined as the product of the chromatic dispersion of an optical fiber and the length of said optical fiber. Thus, the accumulated dispersion of an optical signal, which has traveled over a length z of an optical fiber, is $D*z$, wherein D is the chromatic dispersion of the optical fiber. Thus, at the end of the first span s1 (i.e. at z=l), the accumulated chromatic dispersion is $D*l$, as shown in FIG. 2a. At the end of the first span s1, a dispersion compensator DC1 is provided; thus, the accumulated dispersion of the optical signal is reduced to a value which is lower than $D*l$ (for instance, in FIG. 2a such a value is equal to zero). Then, by propagating along the second span s2, the accumulated dispersion increases again, until the maximum value $D*l$ in z=2l. At z=2l, the dispersion compensator DC2 reduces again the accumulated dispersion of the optical signal to a value which is lower than $D*l$ (for instance, in FIG. 2a such a value is equal to zero). And so on, until the last span sm, wherein the compensator DCm reduces the accumulated dispersion of the optical signal to a value which is comprised within an accumulated dispersion range [ADmin, ADmax].

FIG. 2a shows an ideal case wherein all the spans s1, s2, . . . sm have the same length l, thus introducing the same accumulated dispersion $D*l$. Furthermore, it is assumed that the dispersion compensators DC1, DC2, . . . DCM totally compensate the accumulated dispersion $D*l$ introduced by each span, so that, at the beginning of each span, the residual accumulated dispersion of the optical signal is equal to zero. This is of course a simplification, as in real optical transmission systems spans generally have different lengths, and residual accumulated dispersions are different from zero.

Figure 2B:
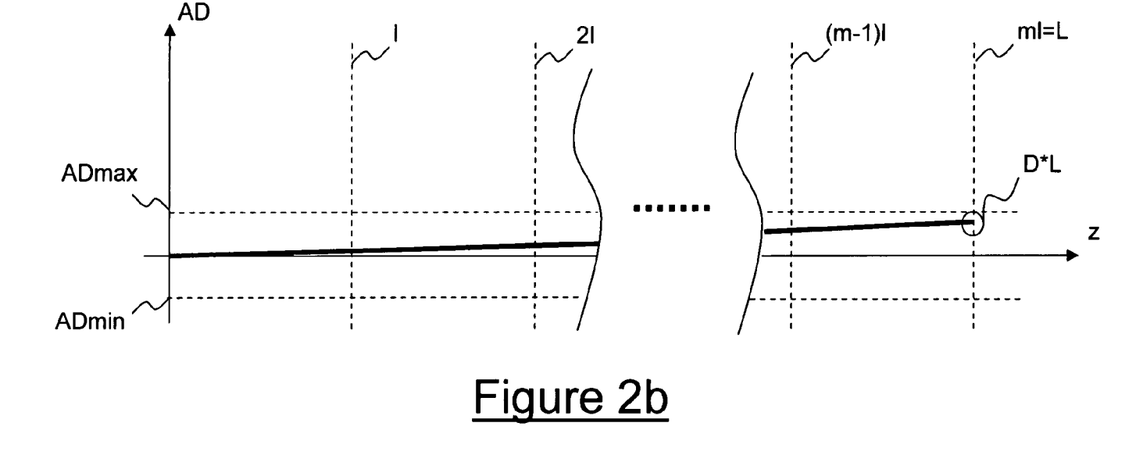

FIG. 2b qualitatively shows the accumulated dispersion AD, as a function of the propagation coordinate z, of an optical signal transmitted into an optical transmission system according to the present invention, as it will be explained in further detail herein after. The graph of FIG. 2b is not in scale. Instead of compensating the dispersion of each span by means of a dispersion compensator, the basic idea of the method according to the present invention is transmitting an optical signal at a transmission wavelength such that the accumulated dispersion of the optical signal always increases during propagation along the link Lk, and the accumulated dispersion at the end of the link Lk is comprised within a tolerated accumulated dispersion range. The graph of FIG. 2b shows that the accumulated dispersion linearly increases as a function of the propagation coordinate z, until, for z=L, the accumulated dispersion reaches its maximum value D*L, which is comprised between ADmin and ADmax. The present invention, in particular, provides a method for properly selecting said transmission wavelength, such that the chromatic dispersion of the optical fiber comprised into the link is such that ADmin≦D*L≦ADmax.

Figure 3:
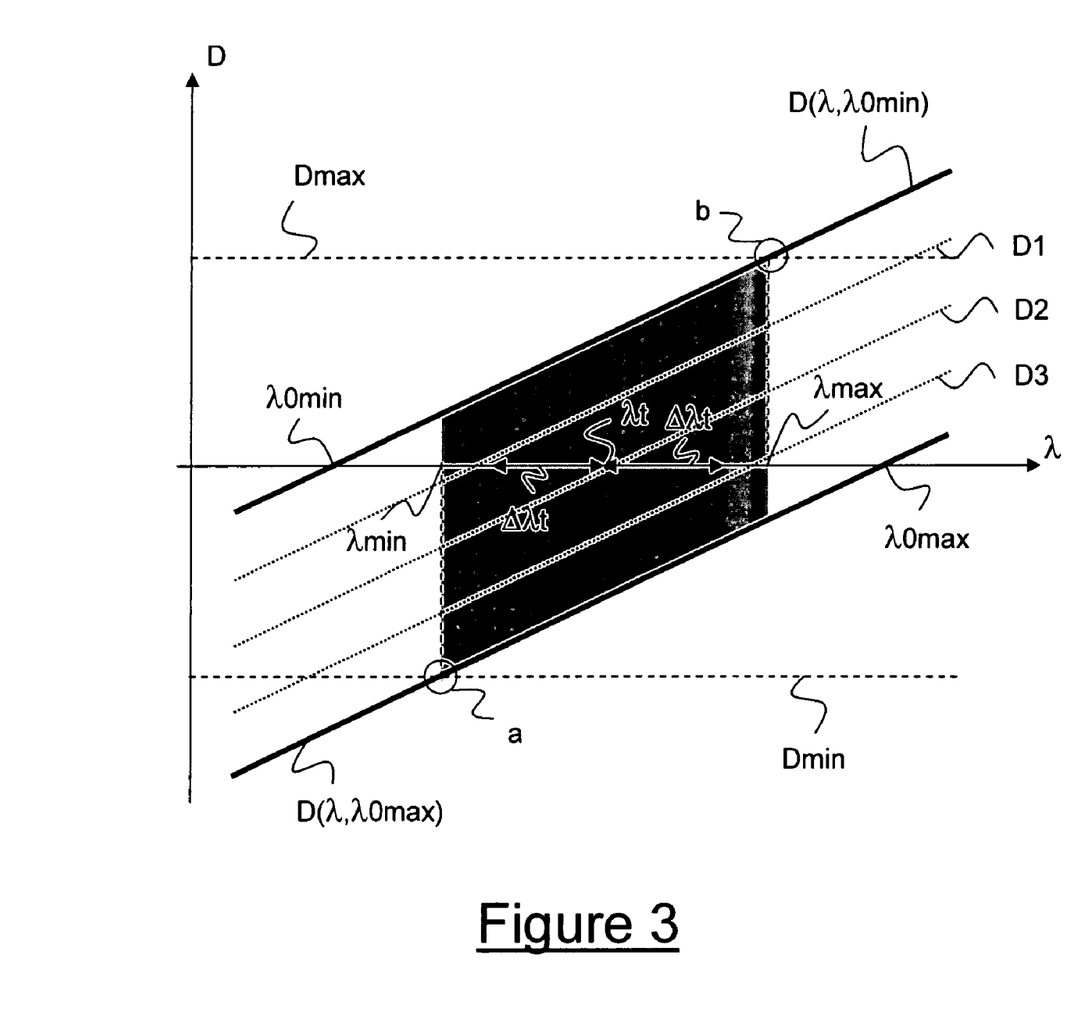
FIG. 3 shows a diagram of the chromatic dispersion versus wavelength which is adapted to select a transmission wavelength of an optical signal according to a first embodiment of the present invention.

FIG. 3 shows a diagram of the chromatic dispersion versus wavelength which is adapted to select a transmission wavelength of an optical signal according to a first embodiment of the present invention.

As already mentioned, the chromatic dispersion of an optical fiber is a function of the wavelength. Optical fibers typically used in optical transmission systems have chromatic dispersion curves with the following features:
- the chromatic dispersion curve increases with the wavelength, at least in the wavelength range which is commonly used for optical transmission systems;
- the chromatic dispersion curve is equal to zero at a zero dispersion wavelength; and
- the chromatic dispersion curve is defined, for a given optical fiber type (G.652, G.653, G.655 or the like) with a certain tolerance.

More particularly, for a given type of fiber, the chromatic dispersion curve must be comprised between a minimum chromatic dispersion curve and a maximum chromatic dispersion curve. Generally speaking, for a given optical fiber type, the minimum chromatic dispersion curve, may be expressed by the following equation:

$$D(\lambda, \lambda 0max) = \frac{\lambda S0max}{4}\left[1 - \left(\frac{\lambda 0max}{\lambda}\right)^4\right], \quad (1)$$

and the maximum chromatic dispersion curve may be expressed by the following equation:

$$D(\lambda, \lambda 0max) = \frac{\lambda S0max}{4}\left[1 - \left(\frac{\lambda 0min}{\lambda}\right)^4\right]. \quad (2)$$

In equations (1) and (2), S0max is the dispersion slope, λ0min is the minimum zero dispersion wavelength and λ0max is the maximum zero dispersion wavelength. For a given optical fiber type, the values of S0max, λ0min and λ0max can be provided either by ITU-T Recommendations or by fiber specifications provided by fiber suppliers.

FIG. 3 shows a maximum chromatic dispersion curve $D(\lambda, \lambda 0min)$ and a minimum chromatic dispersion curve $D(\lambda, \lambda 0max)$, as defined by equations (1) and (2). In the following description, the term "fiber group" will refer to the ensemble of all the optical fibers of a given fiber type, i.e. to the ensemble of all the optical fibers whose chromatic dispersion curves are substantially parallel to $D(\lambda, \lambda 0min)$ and $D(\lambda, \lambda 0max)$ and are comprised between $D(\lambda, \lambda 0min)$ and $D(\lambda, \lambda 0max)$. For instance, FIG. 3 shows three chromatic dispersion curves D1, D2, D3, which are associated to three different optical fibers belonging to the fiber group defined by $D(\lambda, \lambda 0min)$ and $D(\lambda, \lambda 0max)$.

The maximum chromatic dispersion curve $D(\lambda, \lambda 0min)$ is equal to zero at a zero dispersion wavelength λ0min, while the minimum chromatic dispersion curve $D(\lambda, \lambda 0max)$ is equal to zero at a zero dispersion wavelength λ0max. For instance, for fiber type G.652, λ0min is equal to 1300 nm, while λ0max is equal to 1324 nm.

As already mentioned, the method according to the present invention comprises providing a tolerated accumulated dispersion range [ADmin; ADmax]. The method for estimating such a tolerated accumulated dispersion range [ADmin; ADmax] is not an object of the present invention. Once the tolerated accumulated dispersion range [ADmin; ADmax] has been estimated, if L is the link length, a tolerated chromatic dispersion range [Dmin; Dmax] can be estimated as follows:

$$Dmin=ADmin/L, \text{ and}$$

$$Dmax=ADmax/L.$$

For instance, as already mentioned, in a 40 Gbit/s optical transmission system the tolerated accumulated dispersion range may be comprised between ADmin=−60 ps/nm and ADmax=60 ps/nm. Therefore, if the link length is 40 km:

$$Dmin=ADmin/L=-1.5 \text{ ps/nmKm, and}$$

$$Dmax=ADmax/L=1.5 \text{ ps/nmkm.}$$

The Applicant has observed that, within the wavelength range [λ0min; λ0max], a wavelength sub-range can be estimated, wherein both chromatic dispersion curves $D(\lambda, \lambda 0min)$ and $D(\lambda, \lambda 0max)$ are comprised between Dmin and Dmax. In particular, the Applicant has observed that such a wavelength sub-range has a minimum wavelength λmin which can be defined as the wavelength wherein the curve $D(\lambda, \lambda 0max)$ is equal to Dmin (point "a" in FIG. 3), and a maximum wavelength λmax which can be defined as the wavelength wherein the curve $D(\lambda, 0min)$ is equal to Dmax (point "b" in FIG. 3).

It should be noticed that, for any wavelength comprised within the wavelength sub-range [λmin; λmax], also the chromatic dispersion curves D1, D2, D3, which are substantially parallel to $D(\lambda, \lambda 0min)$ and $D(\lambda, \lambda 0max)$ and which are comprised between $D(\lambda, \lambda 0min)$ and $D(\lambda, \lambda 0max)$, are comprised between Dmin and Dmax.

From the physical point of view, this means that an optical signal which is transmitted at a transmission wavelength comprised within the wavelength sub-range [λmin; λmax], along any optical fiber of the fiber group which is defined by $D(\lambda, \lambda 0min)$ and $D(\lambda, \lambda 0max)$, is affected by a chromatic dispersion which is comprised between the tolerated chromatic dispersion range [Dmin; Dmax]. Thus, after propagation along a link Lk whose length is L, the optical signal will have an accumulated chromatic dispersion comprised within the tolerated accumulated chromatic dispersion range [ADmin; ADmax].

Thus, according to this first embodiment of the present invention, the optical transmission system is provided with a transmitter, which is adapted to transmit an optical signal at a transmission wavelength $\lambda t$ comprised within the wavelength sub-range [$\lambda min$; $\lambda max$]. However, a transmitter having a transmission wavelength $\lambda t$ transmits an optical signal at an actual transmission wavelength which is comprised between $\lambda t-\Delta\lambda t$ e $\lambda t+\Delta\lambda t$, wherein $\Delta\lambda t$ is the transmission wavelength tolerance of the transmitter. Thus, in order that the actual transmission wavelength is comprised within the wavelength sub-range [$\lambda min$; $\lambda max$], the transmission wavelength tolerance $\Delta\lambda t$ must be such that $\lambda t-\Delta\lambda t$ is higher than or equal to $\lambda min$, and $\lambda t+\Delta\lambda t$ is lower than or equal to $\lambda max$, as shown in FIG. 3.

For instance, in case of transmission over a 40-km link of G.652 optical fiber, $\lambda 0min$ is equal to 1300 nm and $\lambda 0max$ is equal to 1324 nm. Assuming a 40 Gbit/s bit-rate, Dmin=−1.5 ps/nm/km and Dmax=1.5 ps/nmkm. Thus, according to the first embodiment of the present invention, $\lambda min$ is equal to 1308 nm, while $\lambda max$ is equal to 1316 nm. Thus, for example, the transmitter may have a transmission wavelength $\lambda t$ equal to 1312 nm, with a transmission wavelength tolerance of $\Delta\lambda t$ lower than or equal to 4 nm. It has to be noticed that a tolerance of 4 nm can be obtained with a relatively low cost transmitter, thus obtaining an overall reduction of the optical transmission system cost.

Figure 4:
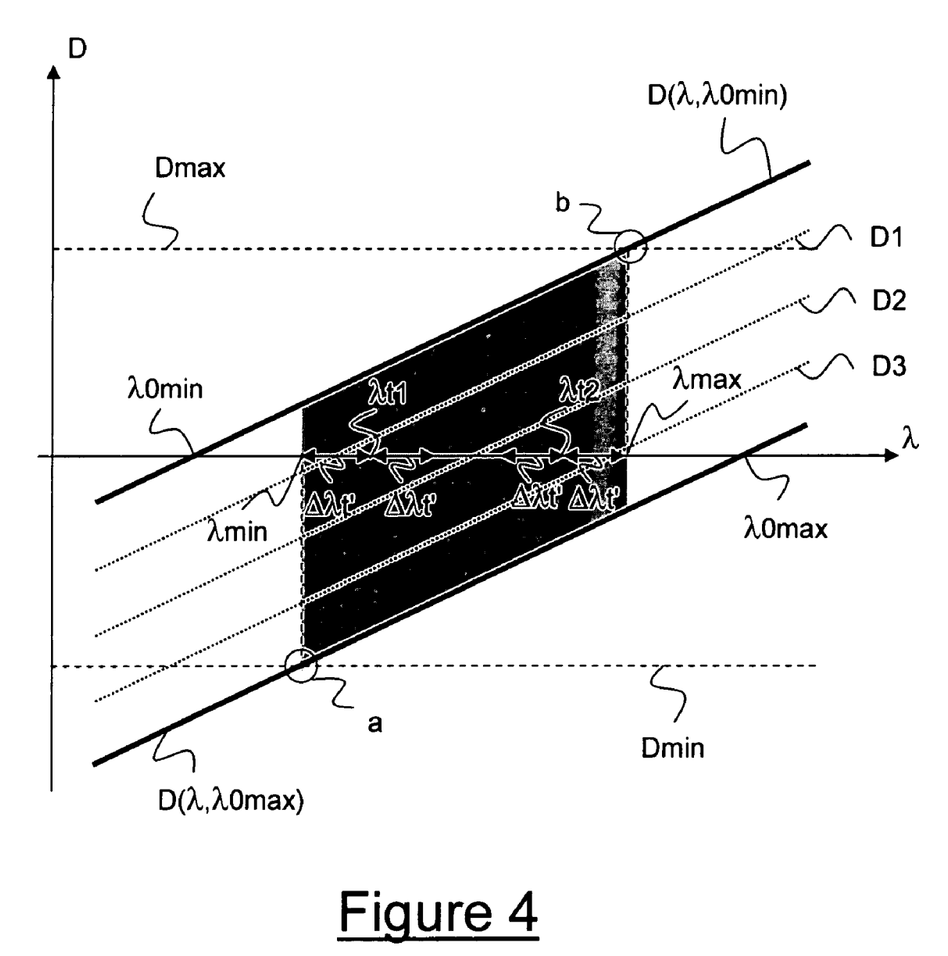
FIG. 4 shows a diagram of the chromatic dispersion versus wavelength which is adapted to select transmission wavelengths of two optical signals according to a second embodiment of the present invention.

FIG. 4 shows a second embodiment of the present invention, wherein the wavelength sub-range [$\lambda min$; $\lambda max$] is used to implement a multi-channel transmission system (for instance, a Dense WDM transmission system or a Coarse WDM transmission system). In the embodiment of FIG. 4, two optical signals with two different transmission wavelengths are transmitted. Of coarse, a higher number of channels could be provided.

The wavelength sub-range [$\lambda min$; $\lambda max$] is estimated by applying the method as described with reference to FIG. 3.

Thus, according to this second embodiment of the invention, the optical transmission system is provided with two transmitters, each transmitter being adapted to transmit a respective optical signal at a respective transmission wavelength $\lambda t1$, $\lambda t2$, which is comprised within the wavelength sub-range [$\lambda min$; $\lambda max$]. Similarly to the first embodiment of the invention, both transmitters have transmission wavelengths $\lambda t1$, $\lambda t2$ and a transmission wavelength tolerance such that the transmission wavelength tolerance ranges [$\lambda t1-\Delta\lambda t'$; $\lambda t1+\Delta\lambda t'$] and [$\lambda t2-\Delta\lambda t'$;$\lambda t2+\Delta\lambda t'$] are comprised within the wavelength sub-range [$\lambda min$; $\lambda max$] and do not overlap each other. Moreover, the two transmission wavelength tolerance ranges [$\lambda t1-\Delta\lambda t'$;$\lambda t1+\Delta\lambda t'$] and [$\lambda t2-\Delta\lambda t'$;$\lambda t2+\Delta\lambda t'$] must be separated by a wavelength interval (as shown in FIG. 4), whose width depends on the characteristics of filters, multiplexers and other wavelength-dependent components of the WDM transmission system. Thus, this requires more stable transmitters, with smaller transmission wavelength tolerance.

The method for selecting the transmission wavelength of an optical signal according to the present invention provides, besides the first and the second embodiment shown in FIGS. 3 and 4 respectively, further embodiments. According to these further embodiments, the wavelength range [$\lambda 0min$;$\lambda 0max$] is divided into a number of wavelength sub-ranges. An optical signal transmitted at any wavelength comprised within each of said wavelength sub-ranges is affected by a chromatic dispersion comprised within a tolerated chromatic dispersion range, in case said optical signal propagates along any optical fiber belonging to a fiber sub-group of the fiber group defined by $D(\lambda,\lambda 0min)$ and $D(\lambda,\lambda 0max)$.

Figure 5:
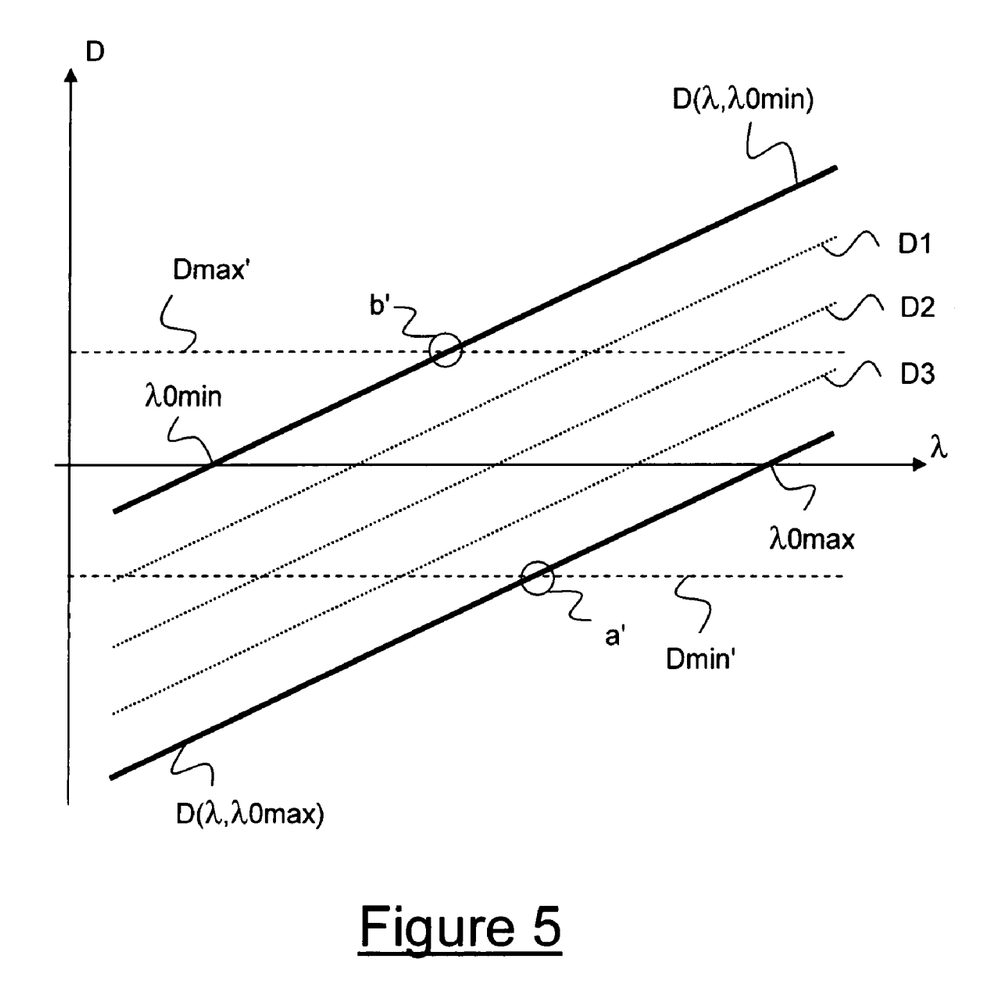
FIG. 5 shows a diagram of the chromatic dispersion versus wavelength wherein a wavelength sub-range as defined according to said first and second embodiments of the present invention can not be estimated.

FIG. 5 shows a case wherein no wavelength comprised within the wavelength range [$\lambda 0min$; $\lambda 0max$] is such that both $D(\lambda,\lambda 0min)$ and $D(\lambda,\lambda 0max)$ are comprised between Dmin and Dmax. This is due to the fact that the point "a'" of intersection between $D(\lambda,\lambda 0max)$ and Dmin' shifts towards higher wavelengths, while the point "b'" of intersection between $D(\lambda,\lambda 0min)$ and Dmax' shifts towards lower wavelengths, until a' is on the right of b'. This may happen, for instance, when the link length L increases; this reduces the tolerated chromatic dispersion range [Dmin, Dmax] to a new tolerated chromatic dispersion range [Dmin', Dmax'], which is narrower.

Figure 6:
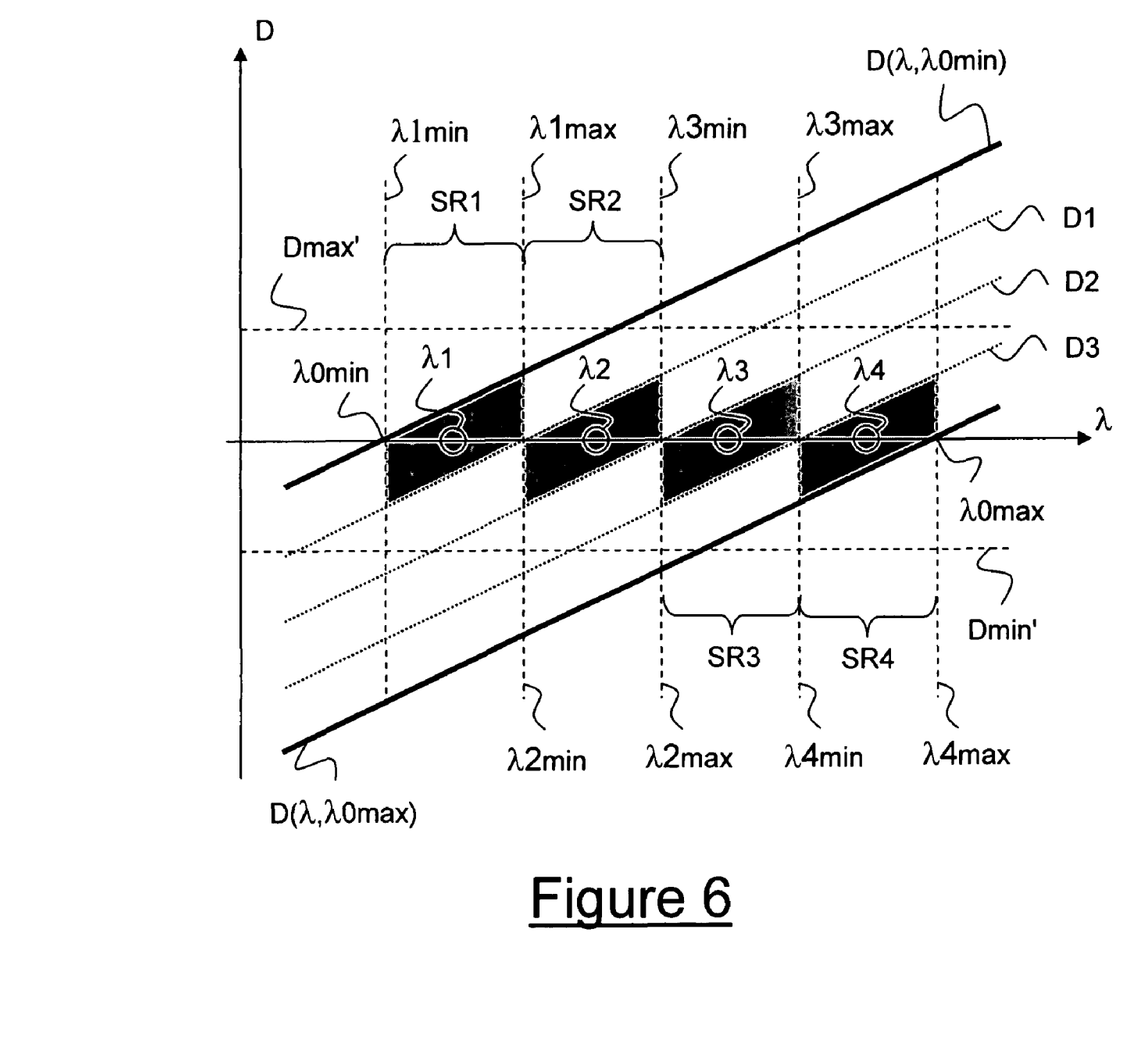
FIG. 6 shows a diagram of the chromatic dispersion versus wavelength which is adapted to select a transmission wavelength of an optical signal according to a third embodiment of the present invention.

FIG. 6 shows a third embodiment of the invention, which can be implemented when the situation shown in FIG. 5 occurs.

FIG. 6 shows the two curves $D(\lambda,\lambda 0min)$ and $D(\lambda,\lambda 0max)$, defining a fiber group. FIG. 6 also shows the new tolerated chromatic dispersion range [Dmin', Dmax']. The wavelength range [$\lambda 0min$; $\lambda 0max$], in this third embodiment, is divided into a number N of non-overlapping contiguous wavelength sub-ranges, wherein N is an integer equal to or higher than 2. In FIG. 6, four sub-ranges SR1, SR2, SR3, SR4 are shown; the optimum number N of wavelength sub-ranges is chosen according to criteria which will be explained herein after.

Once N is chosen, the minimum and maximum wavelength of each wavelength sub-range can be estimated as follows. If N is the number of sub-ranges, the width of each wavelength sub-range is $w=(\lambda 0max-\lambda 0min)/N$. Thus, in case N is equal to 4:

SR1: $\lambda 1min=\lambda 0min$, $\lambda 1max=\lambda 1min+w$;
SR2: $\lambda 2min=\lambda 1max$, $\lambda 2max=\lambda 2min+w$;
SR3: $\lambda 3min=\lambda 2max$, $\lambda 3max=\lambda 3min+w$; and
SR4: $\lambda 4min=\lambda 3max$, $\lambda 4max=\lambda 4min+w=\lambda 0max$.

It can be noticed that wavelengths $\lambda 2min=\lambda 1max$, $\lambda 3min=\lambda 2max$ and $\lambda 4min=\lambda 3max$ are zero dispersion wavelengths of the chromatic dispersion curves D1, D2 e D3, respectively. Thus, the fiber group defined by $D(\lambda,\lambda 0min)$ and $D(\lambda,\lambda 0max)$ is divided into four fiber sub-groups. Each sub-group is associated to a respective wavelength sub-range SR1, SR2, SR3 and SR4, and it is defined as follows:

- the first fiber sub-group comprises optical fibers having chromatic dispersion curves (not shown) substantially parallel to $D(\lambda,\lambda 0min)$ and D1, and comprised between $D(\lambda,\lambda 0min)$ and D1;
- the second fiber sub-group comprises optical fibers having chromatic dispersion curves (not shown) substantially parallel to D1 and D2, and comprised between D1 and D2;
- the third fiber sub-group comprises optical fibers having chromatic dispersion curves (not shown) substantially parallel to D2 and D3, and comprised between D2 and D3; and
- the fourth fiber sub-group comprises optical fibers having chromatic dispersion curves (not shown) substantially parallel to D3 and $D(\lambda,\lambda 0max)$, and comprised between D3 and $D(\lambda,\lambda 0max)$.

It can be noticed that in the first wavelength sub-range SR1, all the chromatic dispersion curves (not shown) of optical fibers of the first fiber sub-group are comprised between Dmin and Dmax. The same applies also to the other wavelength sub-ranges SR2, SR3 and SR4.

Thus, according to this third embodiment of the invention, the optical transmission system is provided with a transmitter which is adapted to transmit an optical signal at a transmission wavelength $\lambda t$. According to this third embodiment, the transmission wavelength $\lambda t$ is a wavelength of a discrete set of wavelengths {$\lambda 1$, $\lambda 2$, $\lambda 3$, $\lambda 4$}; each of the wavelengths $\lambda 1$, $\lambda 2$, $\lambda 3$, $\lambda 4$ is comprised within a respective wavelength sub-range SR1, SR2, SR3, SR4, as shown in FIG. 6. In other words, according to this third embodiment, the transmitter is discretely tunable. For instance, the transmitter may comprise a number N of laser sources (four, by referring to FIG. 6), each laser source being adapted to transmit an optical signal at a respective wavelength λ1, λ2, λ3, λ4.

The above-described discretely-tunable transmitter may be employed, for instance, in an optical transmission system, wherein the link comprises an optical fiber whose type (G.652, G.653, G.655 or the like) is known, whilst the specific chromatic dispersion curve is unknown. According to this third embodiment, the optical fiber necessarily belongs to one of the fiber sub-groups; thus, one of the wavelengths {λ1, λ2, λ3, λ4} is comprised within the wavelength sub-range associated to the fiber sub-group comprising the optical fiber. This wavelength can simply be found by measuring the performance of the optical transmission system by transmitting an optical signal at each of the four wavelengths λ1, λ2, λ3, λ4. Thus, the transmission wavelength λt is selected as follows:

λt=λ1 if the optical fiber belongs to the first sub-group;
λt=λ2 if the optical fiber belongs to the second sub-group;

and so on.

When N increases, the width w of each wavelength sub-range is reduced, thus requiring laser sources with lower transmission wavelength tolerance.

Therefore, according to this third embodiment, N is as low as possible. Thus, N can be found recursively, by firstly applying the method as described by referring to FIG. 6 with N=2. If two wavelengths sub-ranges are not enough, N is increased, until N assumes a value such that each wavelength sub-range may be associate to a respective fiber sub-group, wherein chromatic dispersion in comprised between Dmin and Dmax.

It has to be noticed that, instead of a discretely tunable transmitter comprising N laser sources, a number N of different transmitters can be provided, each transmitter being adapted to transmit at a wavelength λ1, λ2, λ3 or λ4. The transmission wavelength can be selected by plugging each of the transmitters into the transmission board of a transmission system, and by measuring the system performances in these four cases.

As an alternative, a continuously tunable transmitter can be employed, which comprises a single tunable laser source.

The Applicant is of the opinion that when either a discretely tunable transmitter or a continuously tunable transmitter is employed, the cost of the optical transmission system according to the present invention is still lower than the cost of optical transmission systems implementing the known dispersion compensation technique.

Figure 7:
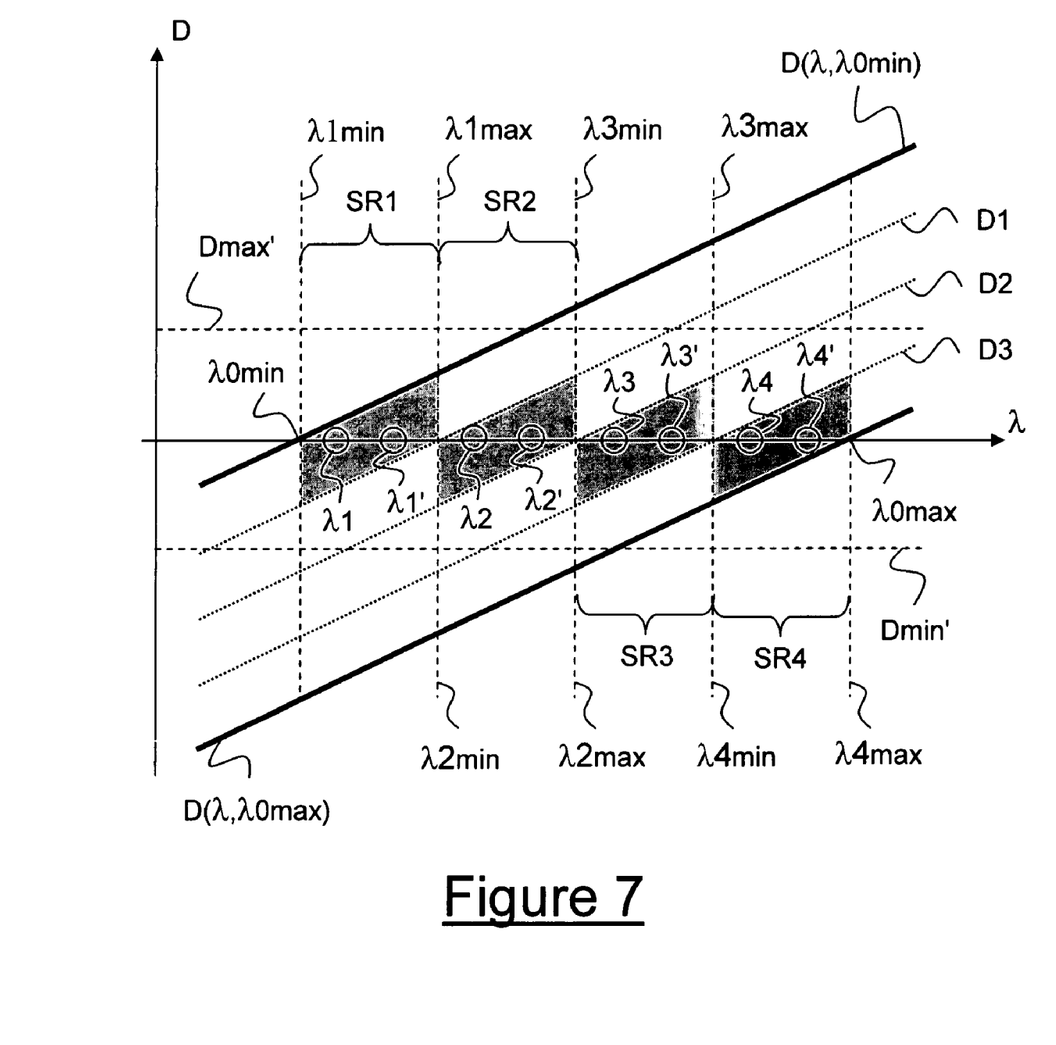
FIG. 7 shows a diagram of the chromatic dispersion versus wavelength which is adapted to select a transmission wavelength of an optical signal according to a fourth embodiment of the present invention.

FIG. 7 shows a diagram of the chromatic dispersion versus wavelength which is adapted to select a transmission wavelength of an optical signal according to a fourth embodiment of the present invention. According to this fourth embodiment, a wavelength sub-range is used for implementing a multi-channel transmission system (e.g. a WDM transmission system). In particular, in the embodiment of FIG. 7, two different optical signals at two different transmission wavelengths are transmitted.

In FIG. 7, four wavelength sub-ranges SR1, SR2, SR3, SR4 are shown; these wavelength sub-ranges are estimated by applying the method of the invention as described by referring to FIG. 6.

In this fourth embodiment, two transmitters are provided. A first transmitter is adapted to transmit a first optical signal at a first transmission wavelength λt1; said first transmission wavelength λt1 is a wavelength of a first discrete set of first wavelengths {λ1, λ2, λ3, λ4}; each of the first wavelengths λ1, λ2, λ3, λ4 is comprised within a respective wavelength sub-range SR1, SR2, SR3, SR4, as shown in FIG. 7. Besides, a second transmitter is adapted to transmit a second optical signal at a second transmission wavelength λt2; said second transmission wavelength λt2 is a wavelength of a second discrete set of second wavelengths {λ1', λ2', λ3', λ4'}; each of the second wavelengths λ1', λ2', λ3', λ4' is comprised within a respective wavelength sub-range SR1, SR2, SR3, SR4. The second wavelengths are different from the first wavelengths λ1, λ2, λ3, λ4, as also shown in FIG. 7.

Each of such transmitters may be implemented, as already mentioned, either as a discretely tunable transmitter, or as a set of N separated transmitters, or as a continuously tunable transmitters.

Thus, according to the optical fiber which is actually comprised into the link of the optical transmission system, the first and the second transmission wavelengths λt1, λt2 will be chosen as follows:

λt1=λ1 and λt2=λ1' if the optical fiber belongs to the first fiber sub-group;
λt1=λ2 and λt2=λ2' if the optical fiber belongs to the second fiber sub-group;

and so on.

In another example, a non-transitory computer readable medium having a program recorded thereon comprises computer program code means adapted to perform the steps described herein when said program is run on a computer.

We claim:

1. A method of transmitting an optical signal in an optical transmission system, said method comprising:
providing a length of an optical fiber having a zero chromatic dispersion wavelength, wherein said optical fiber belongs to an optical fiber group and wherein said optical fiber group comprises optical fibers having a zero chromatic dispersion wavelength that is unknown but comprised within a wavelength range having a minimum zero dispersion wavelength and a maximum zero dispersion wavelength and wherein a fiber specification of said optical fiber group determines said minimum zero dispersion wavelength and said maximum zero dispersion wavelength;
estimating a tolerated chromatic dispersion range using said provided length of said optical fiber;
transmitting said optical signal over said length of optical fiber at a first transmission wavelength, wherein it further comprises:
estimating, within said wavelength range, at least one wavelength sub-range, said at least one wavelength sub-range being such that an optical signal is affected by a chromatic dispersion which is comprised within said tolerated chromatic dispersion range when said optical signal is transmitted at any wavelength of said at least one sub-range, and over any optical fiber of at least one optical fiber sub-group of said optical fiber group, wherein said first transmission wavelength is comprised within said at least one wavelength sub-range.

2. The method according to claim 1, wherein the step of transmitting said optical signal over said length of optical fiber at a first transmission wavelength comprises transmitting said optical signal at a first transmission wavelength which is affected by a transmission wavelength tolerance which is comprised within said wavelength sub-range.

3. The method according to claim 1, wherein the step of transmitting said optical signal further comprises the step of transmitting at least a further optical signal at a second transmission wavelength other than said first transmission wavelength, said second transmission wavelength being comprised within said wavelength sub-range.

4. The method according to claim 1, wherein said at least one optical fiber sub-group substantially corresponds to said optical fiber group.

5. The method according to claim 1, wherein the step of estimating at least one wavelength sub-range comprises estimating two or more wavelength sub-ranges.

6. The method according to claim 1, wherein the step of estimating said tolerated chromatic dispersion range comprises estimating said tolerated chromatic dispersion range according to said length of optical fiber and according to a bit-rate of said wavelength division multiplexing transmission system.

7. The method according to claim 1, wherein said fiber specification comprises one or more of ITU-T G.652, G.653 and G.655 fiber specifications.

8. The method according to claim 1, wherein said optical transmission system is a single-channel transmission system.

9. The method according to claim 1, wherein said optical transmission system is a multi-channel transmission system.

10. The method according to claim 1, wherein said optical transmission system is a single-span transmission system.

11. A non-transitory computer readable medium having a program recorded thereon, said non-transitory computer readable medium comprising computer program code performs all the steps of claim 1 when said program is run on a computer.

12. The method of claim 1, wherein the step of estimating the at least one wavelength sub-range comprises the steps of dividing the wavelength range into a number N wavelength sub-ranges of equal width $(\lambda_{0\text{-}max} - \lambda_{0\text{-}min})/N$ that are non-overlapping and contiguous, wherein the at least one optical fiber sub-groups correspond to the N wavelength sub-ranges.

13. The method of claim 12, wherein the step of dividing the wavelength range comprises the step of:
selecting the number N to be the lowest number such that each wavelength sub-range corresponds to a respective optical fiber sub-group where an optical signal at any wavelength within the wavelength sub-range over any optical fiber of the corresponding optical fiber sub-group is affected by a chromatic dispersion within said tolerated chromatic dispersion range.

14. The method of claim 12, wherein the step of transmitting said optical signal over said length of optical fiber at the first transmission wavelength comprises the steps of
selecting the first transmission wavelength from a first discrete set of a number N wavelengths by measuring system performance of each wavelength of the first discrete set of wavelengths, wherein each wavelength of the first discrete set is contained within a respective wavelength sub-range.

15. An optical transmission system comprising:
a length of an optical fiber having a zero chromatic dispersion wavelength, wherein said optical fiber belongs to an optical fiber group and wherein said optical fiber group comprises optical fibers having a zero chromatic dispersion wavelength that is unknown but comprised within a wavelength range having a minimum zero dispersion wavelength and a maximum zero dispersion wavelength and wherein a fiber specification of said optical fiber group determines said minimum zero dispersion wavelength and said maximum zero dispersion wavelength;
a transmitter being adapted to transmit said optical signal over said length of optical fiber at a first transmission wavelength;
wherein said first transmission wavelength is comprised within a wavelength sub-range, said wavelength sub-range being comprised within said wavelength range and being such that an optical signal is affected by a chromatic dispersion which is comprised within a tolerated chromatic dispersion range when said optical signal is transmitted at any wavelength of the wavelength sub-range, and over any optical fiber of an optical fiber sub-group of said optical fiber group.

16. The system according to claim 15, wherein said transmitter is adapted to transmit at a first transmission wavelength which is affected by a transmission wavelength tolerance which is comprised within said wavelength sub-range.

17. The system according to claim 15, wherein said transmitter is further adapted to transmit at a second transmission wavelength other than said transmission wavelength, said second transmission wavelength being comprised within said wavelength sub-range.

18. The system according to claim 15, wherein said transmitter comprises a fixed-wavelength laser source.

19. The system according to claim 15, wherein said transmitter comprises a continuously tunable laser source.

20. The system according to claim 15, wherein said transmitter comprises a discretely tunable laser source.

21. The system according to claim 15, wherein said fiber specification comprises one or more of ITU-T G.652, G.653 and G.655 fiber specification.

22. The system according to claim 15, wherein said system is a single-channel optical transmission system.

23. The system according to claim 15, wherein said system is a multi-channel optical transmission system.

24. The system according to claim 15, wherein said system is a single-span optical transmission system.

25. A non-transitory computer readable medium having a program recorded thereon, said non-transitory computer readable medium comprising computer program code means adapted to perform, when run on a computer, a method of selecting a transmission wavelength for transmitting a first optical signal in a wavelength division multiplexing transmission system, said method comprising:
selecting an optical fiber group, the optical fibers of said optical fiber group having a zero chromatic dispersion wavelength that is unknown but comprised within a wavelength range having a minimum zero dispersion wavelength and a maximum zero dispersion wavelength and wherein a fiber specification of said optical fiber group determines said minimum zero dispersion wavelength and said maximum zero dispersion wavelength;
estimating a tolerated chromatic dispersion range using said provided length of said optical fiber;
estimating, within said wavelength range, one wavelength sub-range, said wavelength sub-range being such that the chromatic dispersion of any optical fiber of a sub-group of said optical fiber group is comprised within said tolerated chromatic dispersion range for any wavelength of said wavelength sub-range; and
selecting said transmission wavelength such that it is comprised within said wavelength sub-range.

26. The non-transitory computer readable medium according to claim 25, wherein the step of selecting said transmission wavelength comprises selecting a first transmission wavelength which is affected by a transmission wavelength tolerance which is comprised within said wavelength sub-range.

27. The non-transitory computer readable medium according to claim 25, wherein the step of selecting said transmission wavelength further comprises the step of selecting at least a second transmission wavelength other than said first transmission wavelength, said second transmission wavelength being comprised within said wavelength sub-range.

28. The non-transitory computer readable medium according to claim 25, wherein said at least one optical fiber sub-group substantially corresponds to said optical fiber group.

29. The non-transitory computer readable medium according to claim 25, wherein the step of estimating at least one wavelength sub-range comprises estimating two or more wavelength sub-ranges.

30. The non-transitory computer readable medium according to claim 25, wherein the step of estimating said tolerated chromatic dispersion range comprises estimating said tolerated chromatic dispersion range according to said length of optical fiber and according to a bit-rate of said wavelength division multiplexing transmission system.

31. The non-transitory computer readable medium according to claim 25, wherein said fiber specification comprises one or more of ITU-T G.652, G.653 and G.655 fiber specifications.

* * * * *